United States Patent
Stewart et al.

[11] Patent Number: 6,134,221
[45] Date of Patent: Oct. 17, 2000

[54] METHOD FOR EVALUATING A COMMUNICATION LINK BETWEEN A FIRST AND A SECOND COMMUNICATION SITE

[75] Inventors: Randall R. Stewart, Crystal Lake; Qiaobing Xie, Palatine; Phillip D. Neumiller, Cary, all of Ill.

[73] Assignee: Motorola, Inc., Schaumburg, Ill.

[21] Appl. No.: 09/292,733

[22] Filed: Apr. 15, 1999

[51] Int. Cl.[7] .................................................. H04J 3/14
[52] U.S. Cl. .......................... 370/252; 370/242; 370/248; 370/253
[58] Field of Search ................................. 370/242, 248, 370/252, 253

[56] References Cited

U.S. PATENT DOCUMENTS 5,757,801  5/1998  Arimilli ................................... 370/444
5,970,064  10/1999  Clark et al. .............................. 370/351
6,046,985  4/2000  Aldred et al. ............................ 370/252

Primary Examiner—Hassan Kizou
Assistant Examiner—Mitchell Slavitt
Attorney, Agent, or Firm—Kenneth A. Haas

[57] ABSTRACT

The present invention provides a method for evaluating a communication link between a first communication site and a second communication site. The first and second communication sites increment a sent counter and reset a received counter upon sending a message to the other communication site. Each communication site also increments a received counter and reset a sent counter upon receiving a message from the other communication site. When the sent counter exceeds a sent threshold, the communication system site sends an alert that the communication link is down. When the received counter exceeds a predetermined percentage of the other communication site's sent counter, the site sends a message to the other communication site to let the other communication system site know that it is still receiving messages.

9 Claims, 3 Drawing Sheets

METHOD FOR EVALUATING A COMMUNICATION LINK BETWEEN A FIRST AND A SECOND COMMUNICATION SITE

FIELD OF THE INVENTION

The invention relates generally to communication systems, and more particularly to a method for evaluating a communication link between a first communication site and a second communication site.

BACKGROUND OF THE INVENTION

In many communication systems, packets are sent to and from communication sites to facilitate communication. In communication systems utilizing a Voice over Internet Protocol (IP) protocol, these packets are commonly referred to as datagrams.

In typical voice over IP networks, each communication site sends datagrams to other communication sites. There are different approaches to sending datagrams in Voice over IP (VoIP) networks. When data integrity is important, packets can be sent utilizing a more reliable protocol that will utilize error control, retransmissions, and other techniques that increase the likelihood that the datagram will get to its intended destination.

However, in voice applications, there is typically not adequate time to detect that a packet is missing or contains errors and have time to send a message to the sender and have the sending site process this message and resend the message. Typically, in voice applications, if a packet is in error or not received, the packet is discarded and the communication continues.

Consequently, in typical voice over IP applications, there is no way to know whether the communication link between the communication sites is functional because the communication sites do not attempt to resend packets that are not properly received. This "send and pray" method allows no feedback to the communication sites to alert them to a faulty communication link between the communication sites.

Thus, a need exists for a method for evaluating a communication link between communication sites.

DETAILED DESCRIPTION OF PREFERRED EMBODIMENT

The present invention provides a method for evaluating a communication link between a first communication site and a second communication site. Each communication site increments a sent counter and resets a received counter upon sending a message to the other communication site. Each site then compares the sent counter to a local sent threshold to see if the communication site has sent more consecutive messages without receiving a message. If so, this indicates that the communication link is down, because the site is not receiving messages from the other communication site.

Each communication site also increments a received counter and resets the sent counter when a message is received by the communication site. If the number of consecutively received messages exceeds a predetermined percentage of the other communication site's sent threshold, the communication site will send a message to the other communication site to let the other communication site know that it is still receiving messages and still able to send messages on the communication link.

Figure 1:
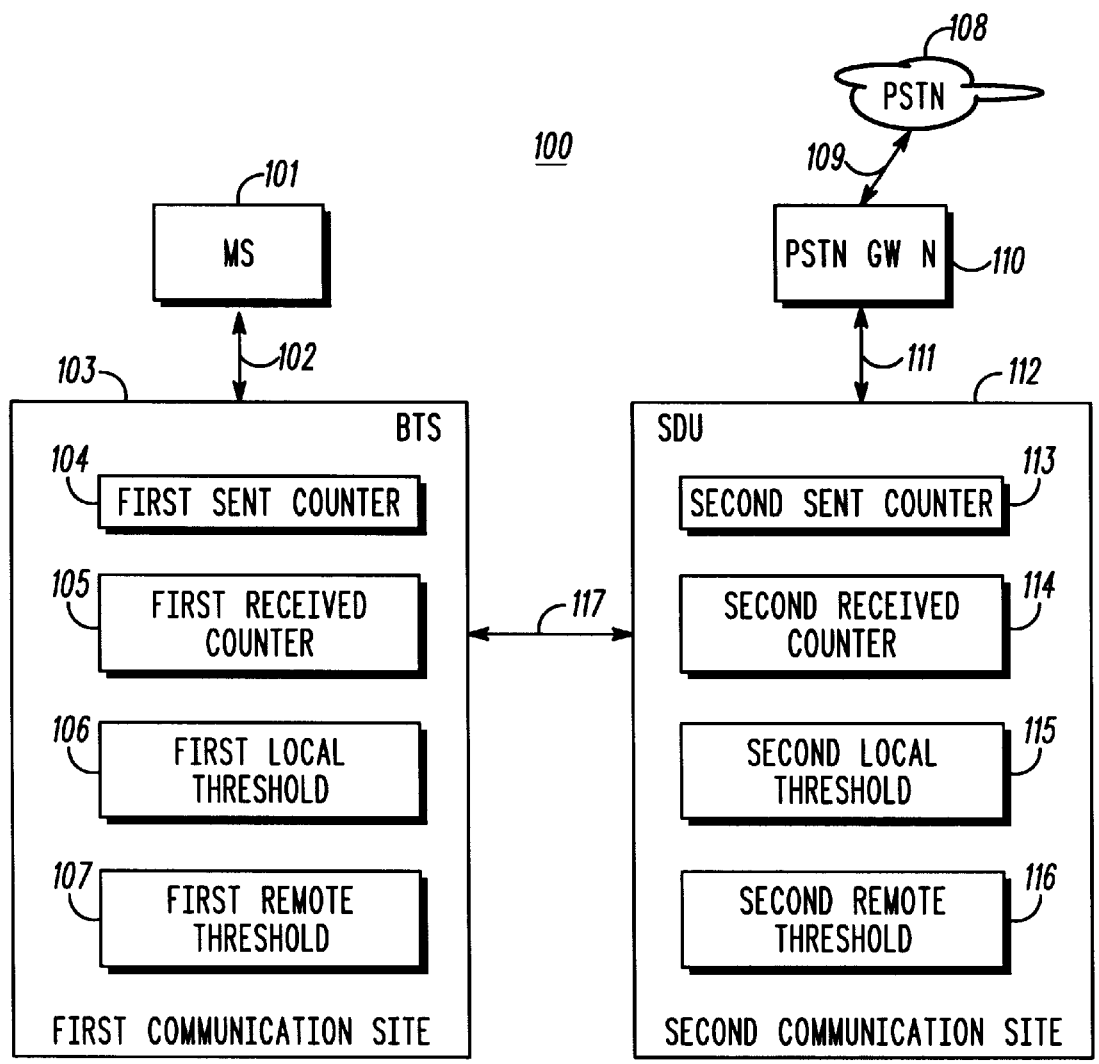
FIG. 1 depicts a communication system in accordance with the preferred embodiment of the present invention.
Figure 2:
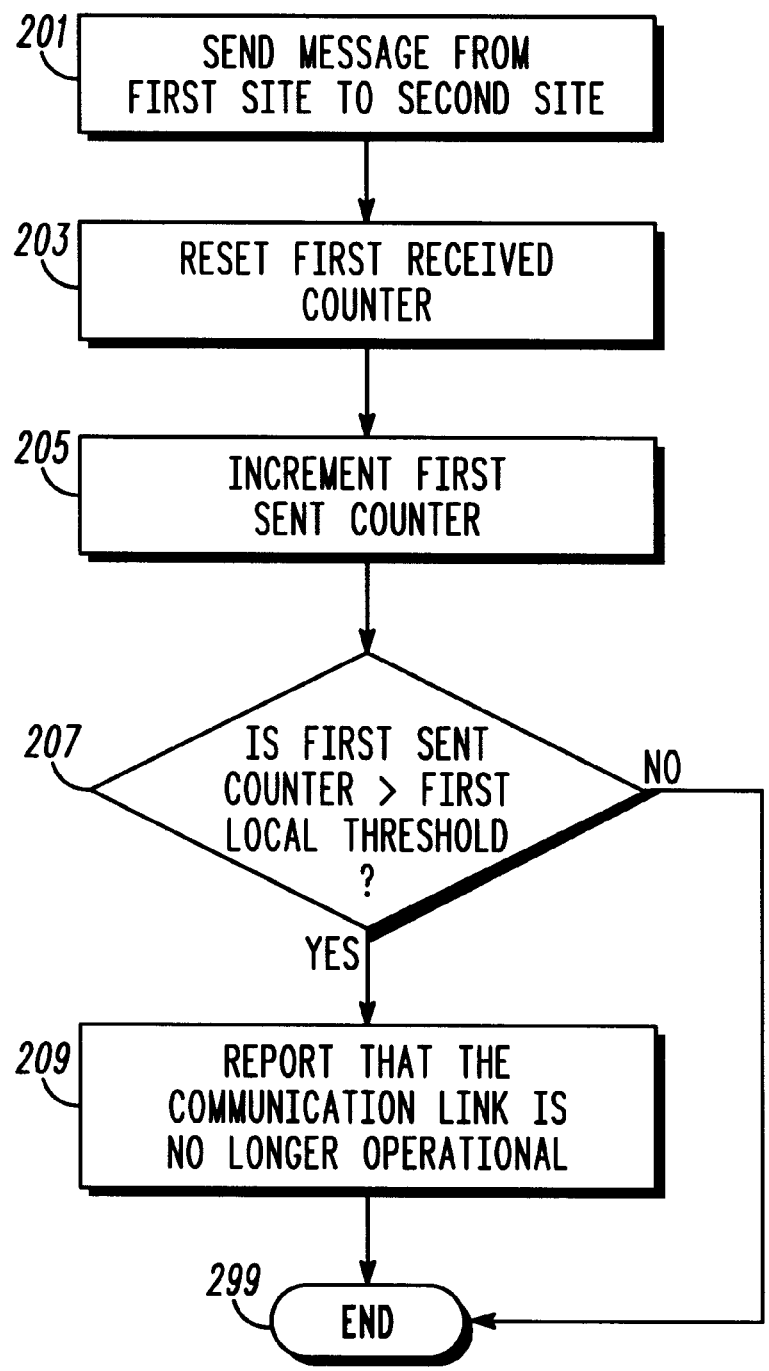
FIG. 2 depicts a flowchart of a method of evaluating a communication link between a first communication site and a second communication site when sending a message in accordance with the preferred embodiment of the present invention.
Figure 3:
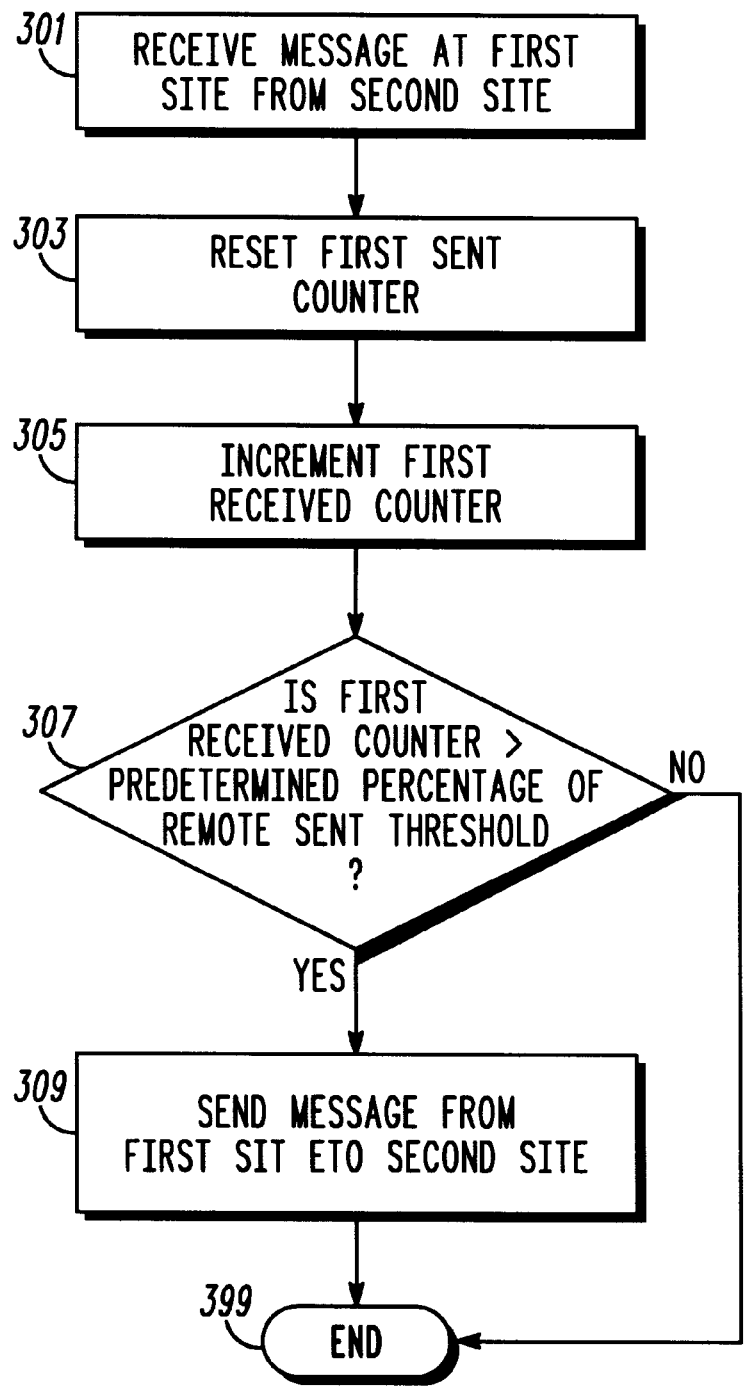
FIG. 3 depicts a flowchart of a method of evaluating a communication link between a first communication site and a second communication site when receiving a message in accordance with the preferred embodiment of the present invention.

The present invention can be better understood with reference to FIGS. 1–3. Referring now to FIG. 1, a communication system 100 in accordance with the preferred embodiment of the present invention is depicted. Communication system 100 is preferably a Voice over IP (VoIP) network, but could alternately be any communication system that requires transmission of messages across communication links in an unreliable fashion and desires to have the ability of detecting failures on those links. Referring to FIG. 1, acronyms are used for convenience. The following is a list of the acronyms used in FIG. 1:

MS Mobile Station
BTS Base Transceiver Station
PSTN Public Switched Telephone Network
GW Gateway
SDU Selection and Distribution Unit FIG. 1 depicts a simplified mobile to PSTN communication system 100, in which voice traffic is carried in both directions between a mobile station 101 and a PSTN network 108. mobile station 101 and PSTN network 108 are connected through communication link 102, BTS 103, communication link 117, SDU 112, communication link 111, PSTN gateway 110, and communication link 109.

Communication link 117 between BTS 103 and SDU 112 is highlighted to illustrate the functioning of the present invention. As indicated in FIG. 1, in order to support communication link 117, the communication device inside the first communication site, i.e., the base transceiver station 103, includes a first sent counter 104, a first received counter 105, a memory storage of first local threshold 106, and a memory storage of first remote threshold 107. Similarly, the communication device inside the second communication site, i.e., the selection and distribution unit 112, includes a second sent counter 113, a second received counter 114, a memory storage of a second local threshold 115, and a memory storage of a second remote threshold 116.

First local threshold 106 and second local threshold 115 hold values that are preferably predetermined and represent, respectively, the number of messages that are sent out by the corresponding communication site without receiving a message from the other communication site and will indicate, when the corresponding threshold is exceeded, that the communication link to the other communication site is no longer operational. In the preferred embodiment, these local thresholds are preferably set, jointly or separately, to some constant configuration parameters.

First remote threshold 107 will preferably have a value equal to that of second local threshold 115, and second remote threshold 116 will preferably have a value equal to that of first local threshold 106. In the preferred embodiment, the values of these remote thresholds will preferably be established by each of the two sites sending to the other site a message that carries the value of its local threshold at the time when the communication link 117 is set up.

FIG. 2 depicts a flowchart 200 of a method of evaluating a communication link between a first communication site and a second communication site when sending a message in accordance with the preferred embodiment of the present invention. A first communication site sends (201) a message to a second communication site. This message can be any datagram that can be delivered to the remote site in a real time manner, such as a voice data frame in a VoIP network. One example of such a message is speech or video stream information for real time processing. Upon sending the message, the first communication site resets (203) a first received counter and increments (205) a first sent counter. The first sent counter is a counter that indicates the number of messages sent by the first communication site without having received a message from the second communication site. The first communication site then determines (207) if the first sent counter is greater than a first sent threshold. The first sent threshold is a value that is predetermined and represents the number of messages that are sent by the first communication site without receiving a message from the second communication site. The first sent threshold indicates, when the threshold is exceeded, that the communication link between the first communication site and the second communication site is no longer operational. In the preferred embodiment, the first sent threshold is preferably set to ten, which allows for 200 milliseconds of speech in systems that send a frame every 20 milliseconds.

If the first sent counter does not exceed the first sent threshold, the process end (299). If the first sent counter exceeds the first sent threshold, this indicates that the link is most likely not operational. The first site reports (209) that the communication link is no longer operational. At this point, the communication system can terminate the communication, can no longer use the communication link, can report the drop in the communication link in an error log or the like, can send an error message to alert an operator that the link is down, or take any other measure to ensure that system resources are functioning properly.

It should be understood that in the preferred embodiment of the present invention the process as described in FIG. 2 is being performed at both the first site and the second site. In this manner, the communication link will be reported as no longer operational when either the first site sends a series of messages without receiving a response from the second site, or when the second site sends a series of messages to the first site without receiving a message from the first site.

FIG. 3 depicts a flowchart of a method of evaluating a communication link between a first communication site and a second communication site when receiving a message in accordance with the preferred embodiment of the present invention. The method described in FIG. 3 is preferably performed at both the first site and the second site, but for purposes of illustration, FIG. 3 depicts the process running at the first site.

The first site receives (301) a message from the second site. Since the first site has received a message, it can assume that the communication link is operational, and consequently the first site resets (303) the first sent counter and increments (305) a first received counter. The first site will increment the number of messages received from the second site so that it can determine whether it needs to send a message to the second site to let the second site know that the communication link is still operational.

The first site then determines (307) if the first received counter is greater than a predetermined percentage of the first remote threshold. The first remote threshold will have a value equal to that of the second local threshold. This value is received by the first site, preferably during communication setup, from the second site. In this manner, the first site knows at what point the second site will report that the communication link is down due to not receiving a message from the first site. Consequently, the first site will monitor the number of continuous message received from the second site and will send a message to the second site when this number of received messages exceeds a percentage of the first remote threshold. In the preferred embodiment, the predetermined percentage is 50%. If the first received counter does not exceed the predetermined percentage of the first remote threshold, the process then ends (399).

In the preferred embodiment, if the first received counter is greater than a predetermined percentage of the remote sent threshold, the first site sends (309) a message to the second site. This message is preferably a short message that simply indicates to the second site that the communication link is still up and that the first site is still receiving messages from the second site. This message is preferably different from the user message sent from the second site and received by the first site as indicated in step 301. In cases where no non-user message can be sent, such as when no acknowledgment message is available, such as on a T1 system, a null speech frame can be sent to the second site. It should be understood that the sending of a normal user message obviates the need for an acknowledgment message or a null speech frame. The process then ends (399).

The present invention therefore provides a method for evaluating a communication link between a first communication site and a second communication site. Each communication site increments a sent counter and resets a received counter upon sending a message to the other communication site. Each site also increments the received counter and resets the sent counter upon receiving a message from the other communication site. In this manner, each communication site is monitoring the number of messages either sent consecutively or received consecutively from the other communication site.

If a communication site determines that it has sent a number of consecutive messages to the other communication site without receiving a message from the other communication system site, then the communication site reports that the communication link between the communication sites is no longer operational.

If a communication site determines that it has received a number of consecutive messages from the other communication site that exceeds a predetermined percentage of the other communication site's sent threshold, the communication site sends a message to the other communication site. This message is typically a short message that alerts the other communication site to the fact that the communication site is able to still send messages on the link. Upon receiving this message, the other communication site will reset its sent counter, thereby preventing it from sending an alert that the communication link is down when it is actually still operational.

While this invention has been described in terms of certain examples thereof, it is not intended that it be limited to the above description, but rather only to the extent set forth in the claims that follow.

We claim:

1. A method for evaluating a communication link between a first communication site and a second communication site, the method comprising the steps of:

incrementing a first sent counter at the first site upon sending a message to the second site;

resetting the first sent counter at the first site upon receiving a message sent from the second site; and reporting that the communication link is down when the first counter exceeds a first predetermined value.

2. A method for evaluating a communication link between a first communication site and a second communication site, the method comprising the steps of:

sending a message from the first communication site to the second communication site over the communication link;

incrementing a first sent counter at the first communication site;

comparing the first sent counter to a first sent threshold; and reporting, if the first sent counter exceeds the first sent threshold, that the communication link is no longer operational.

3. A method for evaluating a communication link in accordance with claim 2, further comprising the step of, subsequent to sending the message from the first communication site to the second communication site, resetting a first received counter at the first communication site.

4. A method for evaluating a communication link between a first communication site and a second communication site, the method comprising the steps of:

receiving a message from the second communication site at the first communication site over the communication link;

incrementing a received counter at the first communication site;

comparing a sent counter to a predetermined percentage of a sent threshold; and sending, if the sent counter exceeds the predetermined percentage of the sent threshold, a message from the first communication site to the second communication site.

5. A method for evaluating a communication link in accordance with claim 4, further comprising the step of, subsequent to receiving the message from the second communication site, resetting the sent counter at the first communication site.

6. A method for evaluating a communication link in accordance with claim 4, wherein the step of sending the message from the first communication site to the second communication site comprises the step of sending the message from the first communication site to the second communication site when the sent counter exceeds at least half the sent threshold.

7. A method for evaluating a communication link in accordance with claim 4, wherein the step of sending a message from the first communication site to the second communication site comprises the step of sending a short message that indicates to the second site that the first site is still receiving messages from the second site.

8. A method for evaluating a communication link in accordance with claim 4, wherein the step of sending a message from the first communication site to the second communication site comprises the step of sending a null speech frame to the second site.

9. A communication system comprising:

a first communication site including a processor and memory effective in storing a first sent counter, a first received counter, a first local threshold, and a first remote threshold; and a second communication site operably coupled to the first communication site and including a processor and memory effective in storing a second sent counter, a second received counter, a second local threshold, and a second remote threshold, wherein the second local threshold equals the first remote threshold and the second remote threshold equals the first local threshold.

* * * * *